US005831379A

United States Patent [19]

Jeong et al.

[11] Patent Number: 5,831,379

[45] Date of Patent: Nov. 3, 1998

[54] DIRECTLY HEATED CATHODE STRUCTURE

[75] Inventors: Bong-Uk Jeong, Seoul; Chang-Seob Kim, Kyungki-do; Dong-Gil Jang, Kyungki-do; Seok-Bong Shon, Kyungki-do, all of Rep. of Korea

[73] Assignee: Samsung Display Devices Co., Ltd., Kyungki-do, Rep. of Korea

[21] Appl. No.: 429,529

[22] Filed: Apr. 26, 1995

Related U.S. Application Data

[63] Continuation-in-part of Ser. No. 187,727, Jan. 28, 1994, abandoned.

[30] Foreign Application Priority Data

May 31, 1994 [KR] Rep. of Korea ...................... 94-12162

[51] Int. Cl.[6] ........................................ H01S 1/15

[52] U.S. Cl. ........................................ 313/346 DC

[58] Field of Search ........................ 313/346 R, 346 DC; 445/50

[56] References Cited

U.S. PATENT DOCUMENTS

| | | | |
|---|---|---|---|
| 3,056,900 | 10/1962 | Tyson | 313/346 R |
| 3,244,930 | 4/1966 | Stutsman | 313/311 |
| 3,689,794 | 9/1972 | Van Esdonk | 313/311 |
| 4,151,440 | 4/1979 | Buescher | 313/340 |
| 4,236,287 | 12/1980 | Smith | 445/51 |
| 4,388,551 | 6/1983 | Ray | 313/345 R |
| 4,459,322 | 7/1984 | Lin | 427/77 |
| 4,636,681 | 1/1987 | Misumi | 313/346 R |
| 4,836,816 | 6/1989 | Bouchard et al. | 445/51 |
| 4,843,277 | 6/1989 | Winkler et al. | 313/346 R |
| 5,007,874 | 4/1991 | Branovich et al. | 445/50 |
| 5,057,736 | 10/1991 | Noda et al. | 313/345 |
| 5,065,070 | 11/1991 | Longo et al. | 313/346 DC |
| 5,074,818 | 12/1991 | Branovich et al. | 445/51 |
| 5,092,805 | 3/1992 | Shon | 445/50 |
| 5,096,450 | 3/1992 | Sugimura et al. | 445/50 |
| 5,236,382 | 8/1993 | Oh | 445/50 |
| 5,289,076 | 2/1994 | Lee | 313/37 |
| 5,475,281 | 12/1995 | Heijboer | 313/337 |

FOREIGN PATENT DOCUMENTS 94547 1/1994 Rep. of Korea .

*Primary Examiner*—Mark R. Powell

*Attorney, Agent, or Firm*—Leydig, Voit & Mayer, Ltd.

[57] ABSTRACT

A directly heated cathode structure includes at least one porous pellet containing electron emission material and filaments secured to at least three side surfaces of the porous pellet to support the pellet stably and prevent vibration caused by shock and potential deformation. Each filament is supported by an insulating block and more than one pellet may be mounted on a single insulating block. As a result, a highly reliable cathode ray tube can be manufactured.

42 Claims, 7 Drawing Sheets

DIRECTLY HEATED CATHODE STRUCTURE

This is a continuation-in-part of U.S. patent application Ser. No. 08/187,727 filed on Jan. 28, 1994 now abandoned in favor of a continuation patent application.

BACKGROUND OF THE INVENTION

The present invention relates to a directly heated cathode structure, and more particularly, to a directly heated dispenser cathode structure for an electron gun for use in a color cathode ray tube.

Generally speaking, cathodes can be divided into two basic types, depending on the method of thermionic emission. One is an indirectly heated type having a separated filament and thermionic emission source. The other is a directly heated type having a connected filament and thermionic emission source.

An indirectly heated cathode is typically used in cases where an electron gun needs to produce a large amount of current. Examples include an oxide cathode and a dispenser cathode. The indirectly heated cathode comprises a sleeve wherein a filament is provided, and a base metal or a cathode material reservoir is fixed onto the sleeve. An oxide cathode material is deposited mainly on the surface of the base material while a dispenser cathode is inserted into the reservoir.

For the case of an indirectly heated cathode, the heat generated by a filament is transmitted to a base metal via a sleeve. Thus, it takes about eight to twelve seconds, which is a rather long time period, for emission of thermions from the cathode material deposited onto the base metal.

Meanwhile, a directly heated cathode is applied to an electron gun for use in a small cathode ray tube, like the viewfinder of a video camera, and generally comprises a base metal or a medium for carrying cathode material which is directly fixed to the filament. In the directly heated oxide cathode, cathode material is deposited on the surface of the base metal. The directly heated dispenser cathode can be applied to large or data display cathode ray tubes which require a large amount of current. The directly heated dispenser cathode includes is structured porous pellets impregnated with a cathode material.

Korea Patent Application No. 91-9461 (by the applicant of the present invention) discloses such a directly heated dispenser cathode whose structure is as shown in FIG. 1. Filaments 2 and 2' directly contact respective sides of a porous pellet 1 containing a cathode material. Specifically, filament 2 is directly welded to opposite sides of the pellet as shown in FIG. 2, or filament 2' is secured to the body of porous pellet 1 as shown in FIG. 3.

For such a cathode, high-density thermionic emission occurs a very short time after current is applied. However, in order to further speed up electron emission, the thermal capacity (the volume of the portion for emitting electrons) must be reduced.

SUMMARY OF THE INVENTION

It is an object of the present invention to provide a directly heated cathode structure wherein a more stabilized supporting structure is provided and faster thermion emission is possible.

To accomplish the above objects, there is provided a directly heated cathode structure comprising a porous pellet containing cathode material, heating means being contacted with the surfaces of the porous pellet, a supporter for supporting the heating means, and an insulating block for supporting the supporter, wherein the heating means comprises at least three filaments whose end portions are directly contacted to a surface of the pellet by a predetermined distance therebetween.

In the above cathode structure of the present invention, the porous pellet can be formed so as to have a circular cross-section or a polygonal cross-section. The filaments contacting the porous pellet are disposed at three or more contact points around the body of the pellet and spaced by a predetermined angle from one another. Thus, the filaments form a supporting structure having three or more contact points with respect to the pellet.

The filament can also be formed of a material which penetrates the pellet body. However, several filaments which are exposed to the exterior of the pellet body can be obtained from a single material.

Application to color cathode ray tubes is made possible by providing a plurality (specifically, three pairs) of pellets for a single insulating block.

DETAILED DESCRIPTION OF THE INVENTION

Figure 1:
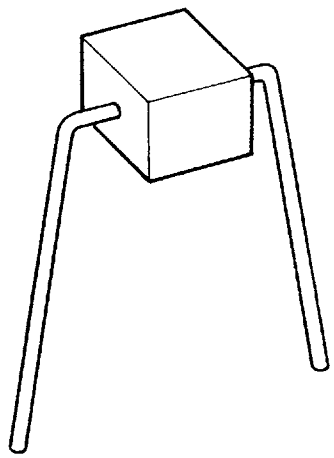
FIG.1(PRIOR ART)
FIG. 1 is a perspective illustration of the conventional directly heated dispenser cathode structure.
Figure 2:
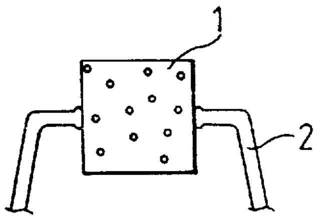
FIG.2(PRIOR ART)
FIGS. 2 and 3 are sectional views showing different types of the conventional cathode structure shown in FIG. 1.
Figure 3:
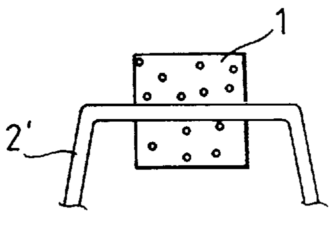
FIG.3(PRIOR ART)
Figure 4:
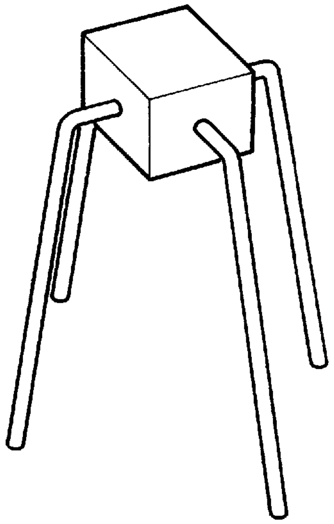
FIG. 4 is a perspective illustration of the directly heated dispenser cathode structure according to the present invention.

FIG. 4 shows embodiment 1 of the present invention. Here, a porous pellet 100, i.e., a source of electron emission, is a porous material obtained by compression-molding and sintering the powder of refractory metals such as tungsten. The porous portion of pellet 100, a hexahedron, is filled with cathode material. Each end portion of four filaments 200 is secured to a respective side of pellet 100 while the other ends extend downward. Pellet 100 can be regarded as having four feet-like components when the four filaments are viewed as one filament.

Figure 5:
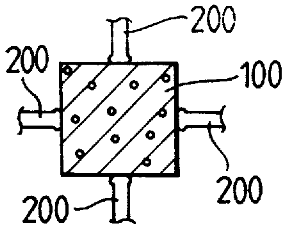
FIG. 5 to FIG. 7 are plan views showing different types of the directly heated dispenser cathode structure of the present invention shown in FIG. 4.
Figure 6:
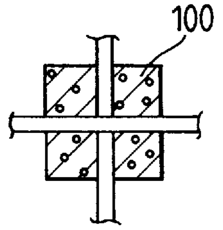
Figure 7:
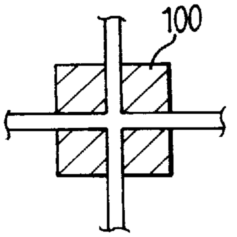

Here, filaments 200 are welded to an outer surface (shown as side surface in the drawing) as shown in FIG. 5. However, as another embodiment, two filaments 200 facing each other are installed so as to cross one another, having passed through the body of pellet 100, as shown in FIG. 6. Therefore, practically, the four filaments exposed to the outside of the pellet are obtained by the two filaments passing through pellet 100. For the case of a secured-type pellet shown in FIG. 6, two filaments 200 contact each other when they cross inside pellet 100, but the two filaments may cross without contacting each other. However, when two filaments contact each other, the crossing filaments are coupled to form a single body as shown in FIG. 7. Thus, four filaments exposed to the outside of pellet 100 can be obtained. Here, there are at least three filaments provided, as necessary. However, it is preferable to prepare four filaments 200, considering various points.

When filaments 200 are welded to the sides of pellet 100 as shown in FIG. 5, each filament may serve as a heating element. However, filaments 200 also serve as legs for supporting a pellet since pellet 100 is directly heated. In other words, at least three filaments 200 support pellet 100 in a balanced arrangement, even when the filament strength is weakened by the applied current which heats the filament. Thus, pellet 100 can be supported with stability, and pellet 100 is not greatly affected by impacts from the outside, to thereby reduce screen instability and lessen the occurrence of color variations on the screen of a manufactured cathode ray tube.

Figure 8:
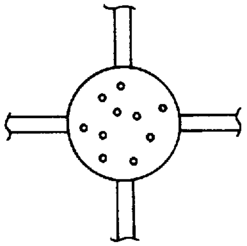
FIG. 8 to FIG. 10 are plan views showing different types of a pellet of an embodiment of the present invention.

Meanwhile, pellet 100 can be modified into various shapes. For example, pellet 100 can be formed so as to have a circular cross-section, as shown in FIG. 8, or a polygonal cross-section as shown in FIGS. 9 and 10.

Figure 9:
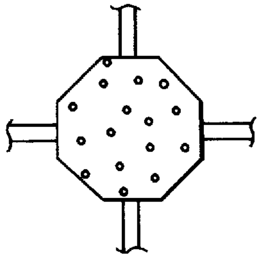
Figure 10:
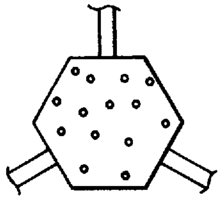

As shown in FIG. 9, in the case of pellet 100 having eight side surfaces, filament 200 is secured to every other side surface, to thereby have a total of four filaments. If necessary, a filament 200 can be installed onto each surface, which results in eight filaments in total. FIG. 10 shows pellet 100 having six side surfaces. Here, the pellet has three filaments 200. Here, however, a filament can be attached to each surface, to thereby make a single pellet 100 having six filaments.

Figure 11:
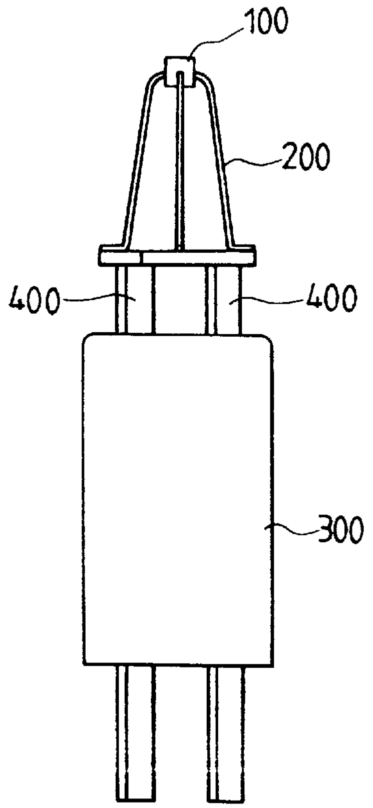
FIG. 11 is a side view of a cathode structure assembled for use in a monochromatic cathode ray tube according to the present invention.
Figure 12:
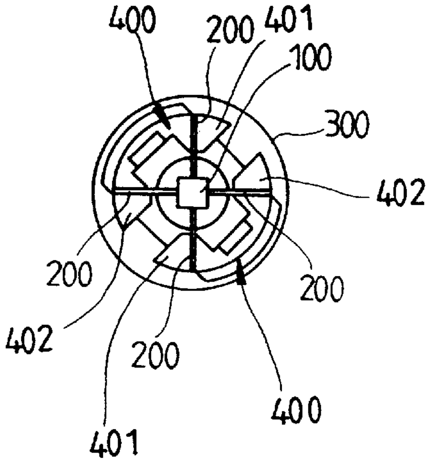
FIG. 12 is a plan view of the cathode structure shown in FIG. 11.

FIGS. 11 and 12 show an embodiment of the directly heated cathode structure of the present invention which can be used for monochromatic cathode ray tubes. Here, filaments 200 are provided on the respective four side surfaces of the hexahedron pellet 100 and are fixed by welding to two supporters 400 installed directly onto a fixed block 300. As shown in FIG. 12, two welding surfaces 401 and 402 are provided for each support 400, and a single filament 200 is fixed to each welding surface 401 and 402. As shown in this structure, two filaments are electrically connected in parallel. Therefore, the current enters (flows in) via two filaments and exits (flows out) via the remaining two filaments. This kind of current application structure can be applied to the above-described filament structure of the present invention. In this structure, since the current in the filament is decreased, the filament heats less and the pellet heats more. When filaments are welded to the side surface of the pellet but do not pass through the pellet, that is, when the pellet itself acts as a resistive filament, the distribution voltage with respect to the pellet increases by lowering the pre-resistance value of the filament, which is more effective. Further, in such a structure, heat is simultaneously provided to the pellet from four filaments, and the pellet can quickly reach the temperature at which thermion emission is possible after current is applied.

Figure 13:
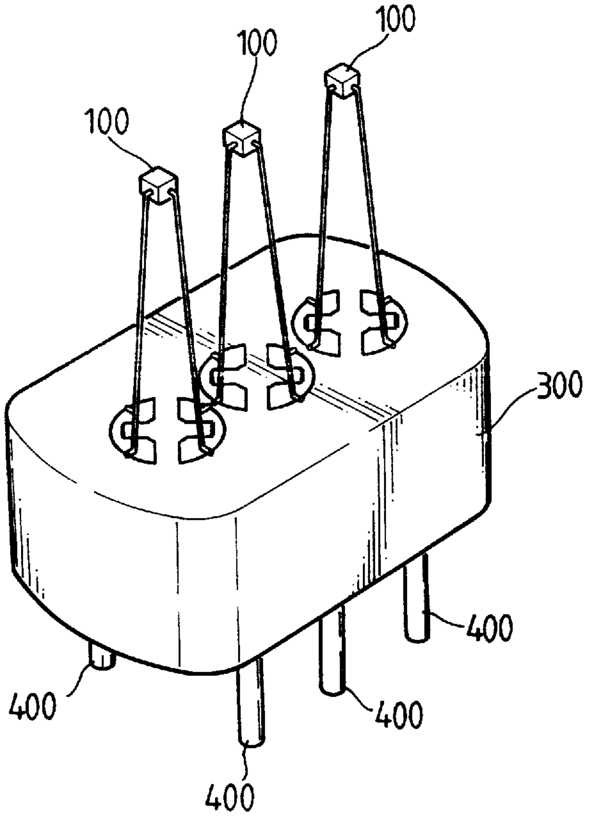
FIG. 13 is a schematic perspective view of a cathode structure according to the present invention assembled for use in a color cathode ray tube.

FIG. 13 shows another embodiment of a cathode structure of the present invention which can be used for a color cathode ray tube. The cathode structure shown in FIG. 13 has three unit structures of FIG. 11 and FIG. 12 onto a single insulating block, and has three pairs of supporters for applying current to each pellet.

In such a structure, an initial time for emitting electrons varies depending on emitter size (volume). If emitter size is too large, it takes an excessive amount of time to heat the emitter. Accordingly, an effect of reducing the time period for emitting electrons is reduced. An emitter that is too small causes difficulty in handling and manufacturing a cathode structure. If an emitter is smaller than a grid hole, it is hard to correctly locate the emitter in the center of the hole. Further, there is a chance for the emitter to deviate from the hole, which degrades the yield in actual application. In addition, an extremely thin emitter may easily crack and continuous electron emission is difficult to achieve.

Figure 14:
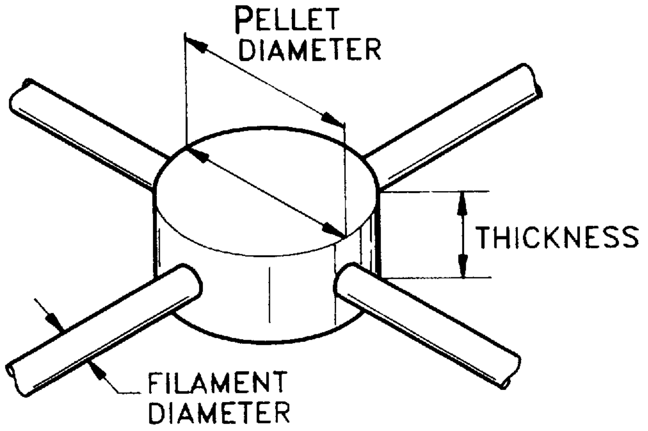
FIG. 14 is a perspective view showing a directly heated dispenser cathode structure of the present invention.

Accordingly, an emitter having a suitable size is required. The preferable emitter (pellet) diameter shown in FIG. 14 is 0.5 mm to 1.5 mm since that emitter size is a little larger than the grid hole (0.4 mm to 0.7 mm) used for a conventional electron gun.

The minimum thickness of an emitter is at least three times that of the filament diameter in order to provide a structure where at least two filaments pass through an emitter. Accordingly, the minimum volume of an emitter can be obtained by multiplying the minimum emitter diameter (0.5 mm) with the minimum emitter thickness (minimum filament diameter 0.02 mm×3).

Figure 15A:
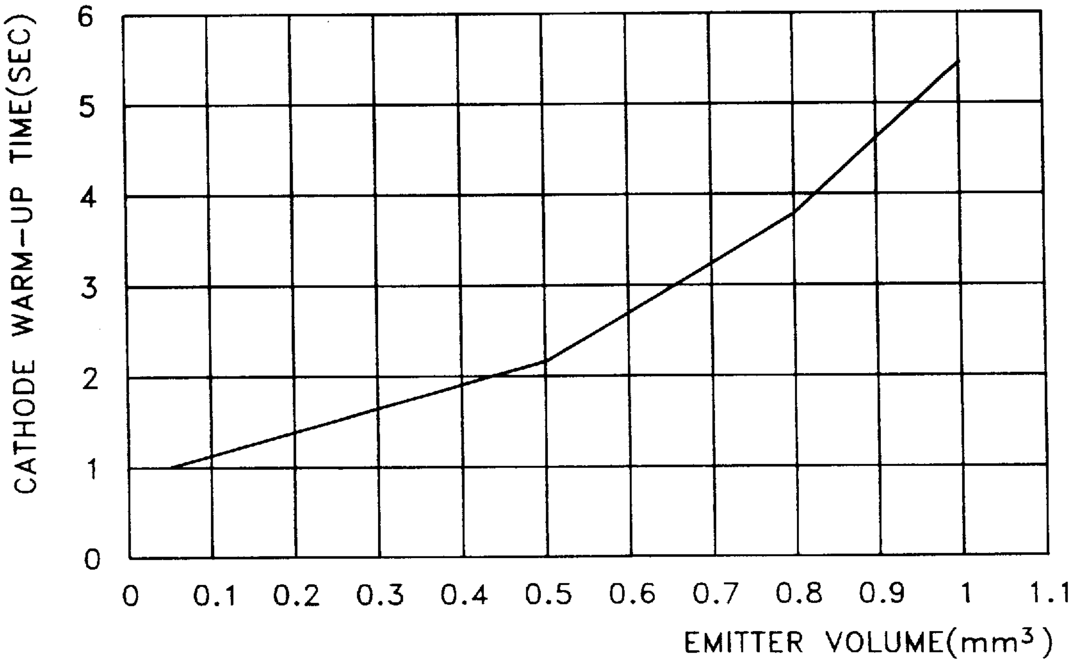
FIG. 15A is a graphical representation showing emitter volume with respect to cathode warm-up time in a directly heated dispenser cathode structure of the present invention.

From the aspect of shortening the cathode warm-up time, as a result of experimentation by the inventor of the present invention, no improvement is obtained to when emitter volume is above 1.0 $mm^3$, as shown in FIG. 15A. Accordingly, the desirable emitter volume is 0.012 $mm^3$ to 1.0 $mm^3$.

Figure 15B:
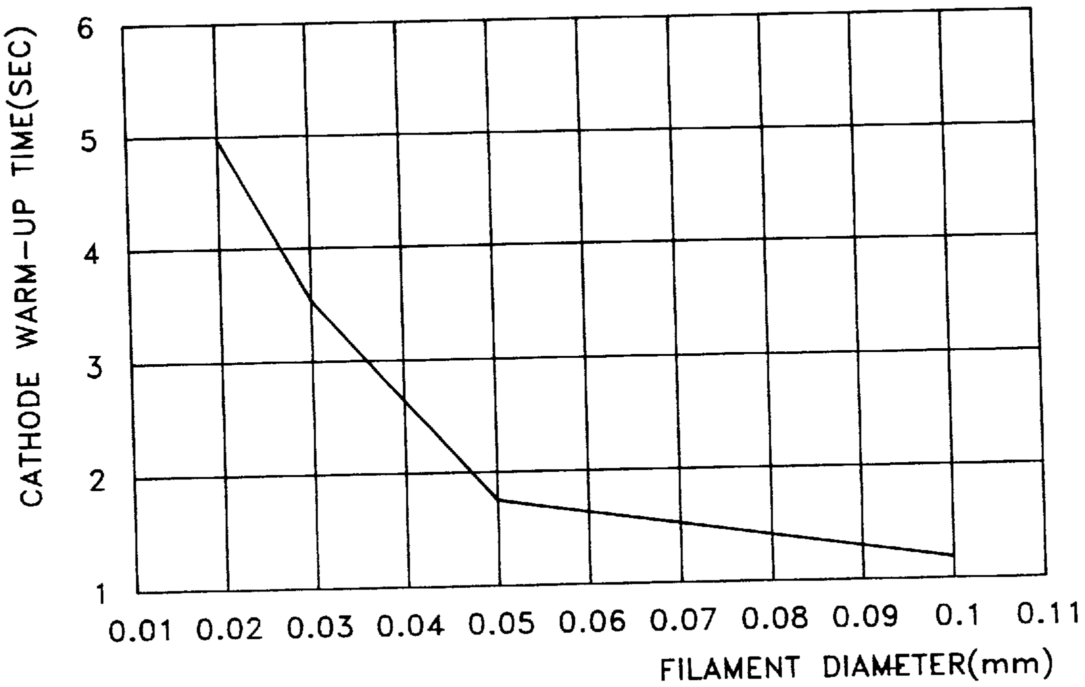
FIG. 15B is a graphical representation showing filament diameter with respect to cathode warm-up time in a directly heated dispenser cathode structure of the present invention.

In addition, the cross sectional area (thickness) of a filament used as a heater greatly affects electron emission time. According to the experimentation of the inventor of the present invention, if filament diameter is small, cathode warm-up time becomes longer. Because when heat energy is transmitted from a filament to an emitter, the contact area is small and the transmission time is thus prolonged. As shown in FIG. 15B, if filament diameter is smaller than 0.02 mm, cathode warm-up time becomes long, which prevents the improvement effect of the present invention. On the contrary, electron emission time can be reduced if the diameter is large.

There is, however, another concern. That is, since a predetermined electrical power ($P=V^2/R$) is required to reach proper operating temperature, and an applied voltage (V) is reduced by lowering resistance according to $R=\rho(l/s)$, where $\rho$ is the resistivity of the material, l is filament length and s is the filament's cross-sectional area, there are restricted alternatives. That is, resistivity $\rho$ is predetermined and length l cannot be enlarged beyond the physical limitations of the cathode structure. Therefore, in practice, filament resistance is governed by the filament's cross-sectional area s, i.e., filament diameter.

Figure 15C:
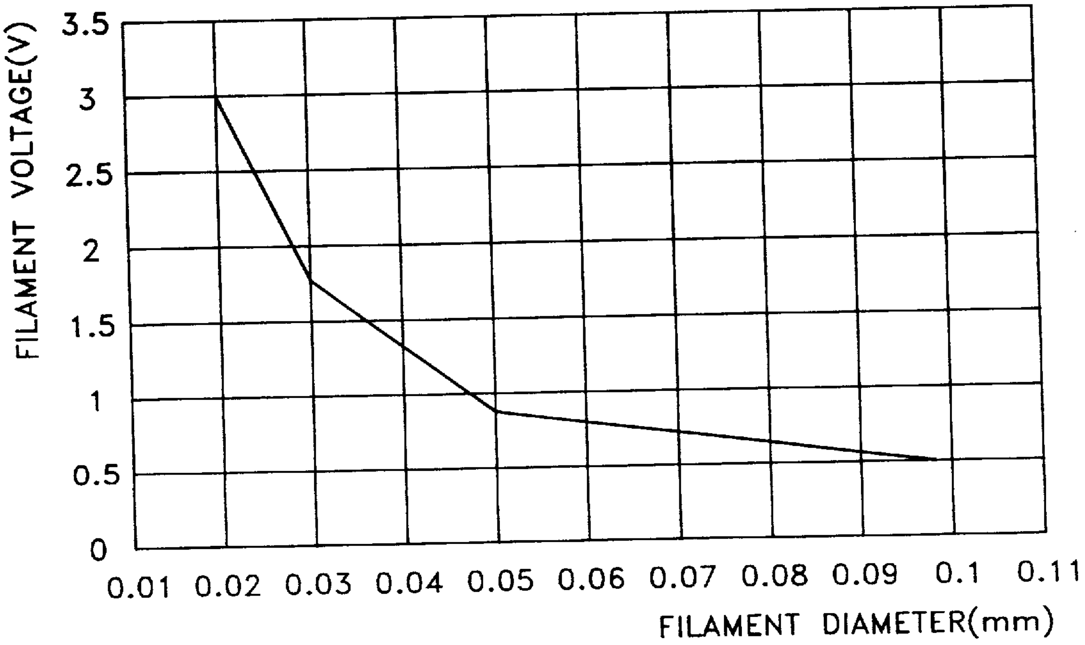
FIG. 15C is a graphical representation showing filament diameter with respect to filament voltage in a directly heated dispenser cathode structure of the present invention.

In general, the applied voltage has an error of ±0.05V or higher with respect to a rated voltage. The cathode's operational characteristics are closely affected if the rated voltage is too low. For example, with respect to a rated voltage of 1V, a 0.05V error is just 5%. However, if the rated voltage is 0.5V, the error is 10%. Due to a cathode characteristic, an operation voltage within ±10% of the rated voltage has to be applied. Therefore, it is desirable that the rated voltage be at least 0.5V in order to reduce the error of the operation voltage. According to the experimentation of the inventor of the present invention, as shown in FIG. 15C, at a given operation temperature, filament diameter has to be kept below 0.1 mm for rated voltages higher than 0.5V. It is preferred that the filament diameter be between 0.02 mm and 0.1 mm so that the cross-sectional area of the filament is between 0.000314 $mm^2$ to 0.00785 $mm^2$.

In the above-described filament structure, at least three filaments are prepared in a single pellet 100 at a predetermined angle. Such a structure is suitable for supporting a pellet having considerable weight. In other words, at least three filaments serve as a support when the pellet receives any jarring impact. Thus, the pellet resists vibration, thereby preventing deformation. The degree of change in relative location with respect to a first grid in an electron gun can be greatly reduced by this shock-suppression effect. As a result, screen image instability is reduced and color variations occur less in the cathode ray tube, which enables stable screen image quality. Specifically, potential abnormal deformation due to extended operation is effectively suppressed. Thus, the cathode structure according to the present invention is more appropriate for use in a color cathode ray tube, and specifically in large-screen televisions or data display cathode ray tubes rather than in general subminiature black-and-white cathode ray tubes. In addition, an optimum emitter size and filament size are established, to thereby provide a cathode structure which enables faster electron emission.

What is claimed is:

1. A directly heated dispenser cathode structure comprising a porous pellet containing cathode material and heating means for heating said porous pellet, said heating means touching surfaces of said porous pellet, said heating means including at least three spaced apart filaments, each filament directly contacting a surface of the pellet and having a diameter ranging from 0.02 mm to 0.1 mm.

2. The directly heated dispenser cathode structure according to claim 1, wherein said porous pellet has a volume ranging from 0.012 $mm^3$ to 0.1 $mm^3$.

3. The directly heated dispenser cathode structure according to claim 1, wherein said porous pellet has a circular cross section.

4. The directly heated dispenser cathode structure according to claim 1, wherein said porous pellet has a polygonal cross section.

5. The directly heated dispenser cathode structure according to claim 1, wherein said porous pellet has a hexahedron.

6. The directly heated dispenser cathode structure according to claim 5, wherein four filaments are secured to four sides of said pellet, respectively.

7. The directly heated dispenser cathode structure according to claim 1, wherein said filaments pass through said pellet.

8. The directly heated dispenser cathode structure according to claim 2, wherein said filaments pass through said pellet.

9. The directly heated dispenser cathode structure according to claim 1, wherein said filaments pass through said pellet.

10. The directly heated dispenser cathode structure according to claim 3, wherein said filaments pass through said pellet.

11. The directly heated dispenser cathode structure according to claim 4, wherein said filaments pass through said pellet.

12. The directly heated dispenser cathode structure according to claim 5, wherein said filaments pass through said pellet.

13. The directly heated dispenser cathode structure according to claim 6, wherein said filaments pass through said pellet.

14. The directly heated dispenser cathode structure according to claim 7, wherein said filaments are coupled into one body within said pellet.

15. The directly heated dispenser cathode structure according to claim 1, wherein said filaments are fixedly welded to side surfaces of said pellet at a fixed angle and spacing from each other.

16. The directly heated dispenser cathode structure according to claim 2, wherein said filaments are fixedly welded to side surfaces of said pellet at a fixed angle and spacing from each other.

17. The directly heated dispenser cathode structure according to claim 1, wherein said filaments are fixedly welded to side surfaces of said pellet at a fixed angle and spacing from each other.

18. The directly heated dispenser cathode structure according to claim 3, wherein said filaments are fixedly welded to side surfaces of said pellet at a fixed angle and spacing from each other.

19. The directly heated dispenser cathode structure according to claim 4, wherein said filaments are fixedly welded to side surfaces of said pellet at a fixed angle and spacing from each other.

20. The directly heated dispenser cathode structure according to claim 5, wherein said filaments are fixedly welded to side surfaces of said pellet at a fixed angle and spacing from each other.

21. The directly heated dispenser cathode structure according to claim 6, wherein said filaments are fixedly welded to side surfaces of said pellet at a fixed angle and spacing from each other.

22. The directly heated dispenser cathode structure comprising a porous pellet containing cathode material, heating means for heating said porous pellet, said heating means touching surfaces of said porous pellet, a support member supporting the heating means, and an insulating block supporting said support member, said heating means including at least three spaced apart filaments, each filament directly contacting a surface of the pellet and having a diameter ranging from 0.02 mm to 0.1 mm, said filaments being separated from each other by a fixed distance.

23. The directly heated dispenser cathode structure according to claim 22, wherein said porous pellet has a volume ranging from 0.012 $mm^3$ to 1.0 $mm^3$.

24. The directly heated dispenser cathode structure according to claim 22, wherein said pellet is a hexahedron and said heating means includes four filaments secured to four sides of said pellet, respectively.

25. The directly heated dispenser cathode structure according to claim 24, wherein said supporter includes two welding surfaces and said filaments are welded to said welding surfaces.

26. The directly heated dispenser cathode structure according to claim 22, wherein said filaments pass through said pellet.

27. The directly heated dispenser cathode structure according to claim 23, wherein said filaments pass through said pellet.

28. The directly heated dispenser cathode structure according to claim 24, wherein said filaments pass through said pellet.

29. The directly heated dispenser cathode structure according to claim 25, wherein said filaments pass through said pellet.

30. The directly heated dispenser cathode structure according to claim 26, wherein said filaments are coupled into one body within said pellet.

31. The directly heated dispenser cathode structure according to claim 22, wherein said filaments are fixedly welded to side surfaces of said pellet at a fixed angle and spacing from each other.

32. The directly heated dispenser cathode structure according to claim 23, wherein said filaments are fixedly welded to side surfaces of said pellet at a fixed angle and spacing from each other.

33. The directly heated dispenser cathode structure according to claim 24, wherein said filaments are fixedly welded to side surfaces of said pellet at a fixed angle and spacing from each other.

34. The directly heated dispenser cathode structure according to claim 25, wherein said filaments are fixedly welded to side surfaces of said pellet at a fixed angle and spacing from each other.

35. The directly heated dispenser cathode structure according to claim 31, wherein said support member includes a plurality of pairs of support elements spaced apart and mounted on said insulating block, a respective pellet corresponding to each of said support pairs.

36. The directly heated dispenser cathode structure according to claim 22, wherein said support member includes a plurality of pairs of support elements spaced apart and mounted on said insulating block, a respective pellet corresponding to each of said support pairs.

37. The directly heated dispenser cathode structure according to claim 23, wherein said support member includes a plurality of pairs of support elements spaced apart and mounted on said insulating block, a respective pellet corresponding to each of said support pairs.

38. The directly heated dispenser cathode structure according to claim 24, wherein said support member includes a plurality of pairs of support elements spaced apart and mounted on said insulating block, a respective pellet corresponding to each of said support pairs.

39. The directly heated dispenser cathode structure according to claim 25, wherein said support member includes a plurality of pairs of support elements spaced apart and mounted on said insulating block, a respective pellet corresponding to each of said support pairs.

40. The directly heated dispenser cathode structure according to claim 36, wherein said support member includes three pairs of support elements, and including three pellets.

41. A directly heated dispenser cathode structure comprising a porous pellet containing cathode material and heating means for heating said porous pellet, said heating means touching surfaces of said porous pellet, said heating means including at least three spaced apart filaments, each filament directly contacting a surface of the pellet and having a cross-sectional area ranging from 0.00314 $mm^2$ to 0.00785 $mm^2$.

42. The directly heated dispenser cathode structure comprising a porous pellet containing cathode material, heating means for heating said porous pellet, said heating means touching surfaces of said porous pellet, a support member supporting the heating means, and an insulating block supporting said support member, said heating means including at least three spaced apart filaments, each filament directly contacting a surface of the pellet and having a cross-sectional area ranging from 0.000314 $mm^2$ to 0.00785 $mm^2$, said filaments being separated from each other by a fixed distance.

* * * * *

UNITED STATES PATENT AND TRADEMARK OFFICE

CERTIFICATE OF CORRECTION

PATENT NO. : 5,831,379

DATED : November 3, 1998

INVENTOR(S) : Jeong et al.

It is certified that error appears in the above-identified patent and that said Letters Patent is hereby corrected as shown below:

Column 5, Line 52, change "has" to --is--;

Column 6, Line 41, change "The" to --A--;

Column 8, Line 26, change "The" to --A--.

Signed and Sealed this

Ninth Day of March, 1999

*Attest:*

Q. TODD DICKINSON

*Attesting Officer*

*Acting Commissioner of Patents and Trademarks*